United States Patent [19]

Gunther

[11] 4,227,287
[45] Oct. 14, 1980

[54] FULL EJECTION STUD ASSEMBLY

[75] Inventor: Conrad J. Gunther, Uniondale, N.Y.

[73] Assignee: Dzus Fastener Co., Inc., West Islip, N.Y.

[21] Appl. No.: 974,075

[22] Filed: Dec. 28, 1978

[51] Int. Cl.² ........................................... A44B 17/00
[52] U.S. Cl. ................................... 24/221 K; 85/5 P
[58] Field of Search ............ 24/221 K, 221 R, 221 A; 85/5 P

[56] References Cited

U.S. PATENT DOCUMENTS

| | | | |
|---|---|---|---|
| 2,054,519 | 9/1936 | Dzus | 85/5 P |
| 2,186,747 | 1/1940 | Albin | 24/221 A |
| 2,527,408 | 10/1950 | Dzus | 24/221 A |
| 2,580,666 | 1/1952 | Dzus | 24/221 K |
| 2,858,156 | 10/1958 | Wootton | 24/221 K |
| 2,922,211 | 1/1960 | Boyd | 24/221 K |
| 3,327,363 | 6/1967 | Knight | 24/221 A |
| 3,561,076 | 2/1971 | Gunther | 24/221 A |
| 3,584,350 | 6/1971 | Schenk | 24/221 K |
| 3,827,110 | 8/1974 | Dzus | 24/221 A |
| 4,067,090 | 1/1978 | Schenk | 24/221 K |

Primary Examiner—Nile C. Byers, Jr.
Attorney, Agent, or Firm—Kane, Dalsimer, Kane, Sullivan & Kurucz

[57] ABSTRACT

A full ejection stud assembly adapted to be coupled to one member and removably interconnected with a receptacle coupled to a second member to form a fastener assembly for holding the two members together. The stud assembly includes a stud having an enlarged head and a reduced diameter shank extending from one side of the head. A cup is provided with a through passageway for slidably extending the shank of the stud therethrough. The cup is adapted to be mounted on the one member in position with respect to an opening in the one member so that the shank of the stud can pass reciprocally therethrough. A retainer is on the cup and stud to limit the reciprocal movement of the stud shank through the passageway of the cup and the opening in the one member between a closed position for interconnection with a receptacle to hold the two members together and an open position free of the receptacle to permit separation of the two members. A spring is normally biased in the closed position with the stud interconnected to a receptacle so as to eject the stud to the open position free of the receptacle when the stud is disconnected from the receptacle.

10 Claims, 5 Drawing Figures

FULL EJECTION STUD ASSEMBLY

BACKGROUND OF THE INVENTION

The fastener art is a highly developed field with many diverse types of fasteners used in different environments to accomplish different functions.

One well known category of fastener utilizes the quarter turn concept. In that type of structure, a simple quarter turn of a stud and receptacle with respect to one another will release or lock the fastener. It is particularly adapted to environments where frequent and rapid entry to enclosures is desired or where assembly and disassembly is needed. For example, in the aircraft industry, fasteners of this type have been used for many years. In those complex structures, there are many compartments and areas where enclosure panels have to be removed quickly for access for inspection or repair purposes. It should also be kept in mind that rather large complex structures are involved. Accordingly, mass numbers of fasteners are used in many cases on a single structure. For example, in a supersonic transport, one can readily envision the large numbers of fasteners that are used.

There is one area of concern in dealing with the quarter turn type of fastener employing a two part stud and receptacle arrangement or in other common types of fasteners utilizing more than one part such as the conventional nut and bolt assembly. When one unfastens the assembly there is usually at least one free component. Each free component has to be handled, stored and inventoried for reassembly purposes. Also, when reassembly does occur, it is necessary to realign the components of the assembly to facilitate their interconnection. These activities are time consuming and costly. This is true both from an original construction standpoint and repair and maintenance standpoint.

A further area in which an advantage can be obtained in regard to original construction and opening and closing of enclosures, particularly when dealing with quarter turn fasteners, is the concept of an ejection process for facilitating separation of the fastener components when the assembly is opened. Normally when one considers this type of assembly, when the elements are rotated relative to one another, they eventually become free. However they must be displaced before the members being fastened such as panel structures can be easily separated. With this in mind, it can be seen how cost and time again become significant factors particularly when dealing with mass numbers of fasteners and frequent assembly and disassembly.

Thus, it would be extremely advantageous to provide an improved fastener, for example of this quarter turn type, whereby full ejection means is immediately provided for facilitating complete separation of the fastener components. Also, retention structure should be available to retain all fastener parts in their relative positions with respect to the members being fastened and unfastened so that disassembly and reassembly can be quickly and efficiently carried out without the necessity of having to handle, store and keep track of separated components. Naturally this is particularly true when one considers mass usage such as encountered in large structures like supersonic airliners.

SUMMARY OF THE INVENTION

With the above background in mind, it is among the primary objectives of the present invention to provide a full ejection stud assembly which is adapted to be coupled with a conventional type of receptacle to releasably retain two members together. It is an objective to provide a unitary structure for the stud which is mountable to one member and has spring means for biasing the stud with respect to a receptacle on a further member to be fastened. The spring is for facilitating full ejection and quick release of the stud from the receptacle when the members are to be separated. Additionally, the stud is provided with retention means to control the reciprocal movement of the stud relative to the member on which it is mounted. Thus, the stud is adapted to be mounted to a member to be fastened and is permitted a limited reciprocal movement for extension into a receptacle mounted to a second member and full ejection from the receptacle and the second member upon release of the fastener assembly. The stud assembly is a simple, inexpensive and easy to utilize structure particularly adaptable as a quarter turn stud for interconnection with a receptacle having a cam follower therein. The stud can be provided with an appropriate cam slot for releasable interconnection with the cam follower upon a quarter turn relative rotation between the stud and the cam follower and the receptacle on which the cam follower is mounted.

It is an objective to provide a unitary stud assembly with means for mounting the assembly on the surfaces surrounding an aperture in one member to be fastened and to provide a compact structure with retention means, biasing means and mounting means on the structure for facilitating the reciprocal movement of the stud within a confined distance for movement between an open position and a closed position where it can engage with a receptacle. The design is such that the stud of the stud assembly is provided with a head and a reduced diameter shank whereupon, in the closed position, the undersurface of the head is brought into sealing engagement with the remaining operative structure of the assembly while the stud extends through an opening in the remaining structure into the fastening position. The result is a compact, inexpensive unitary structure for accomplishing the many functions of the stud assembly for use as a full ejection stud assembly with a conventional type of fastener, particularly adaptable for use in quarter turn fastener environments such as in large aircraft.

Also, the stud assembly is designed of a minimum number of components and can be easily and efficiently mounted in fixed position on a member to be fastened. For example, it can be mounted on a plastic panel with the stud extending through an aperture in the panel for coupling with a second panel or support structure on which a receptacle is mounted.

Only a single hole is required for mounting of the stud assembly. Furthermore, an effective water seal is provided by the use of assembly sealing elements as part of the stud assembly.

In summary, a full ejection stud assembly is provided and it is adapted to be coupled to one member and removably interconnected with a receptacle coupled to a second member to form a fastener assembly for holding the two members together. The stud assembly includes a stud having an enlarged head and a reduced diameter shank extending from one side of the head and having means thereon for interconnecting with a receptacle. A cup is provided and has a through passageway for slidable extension of the shank of the stud therethrough. The cup has mounting means thereon for mounting the cup on the one member in position with respect to an opening in the one member so that the shank of the stud can pass reciprocally therethrough. Retention means is on the cup and stud to limit the reciprocal movement of the stud shank through the passageway of the cup and through the opening in the one member between a closed position for interconnection with a receptacle to hold the two members together and an open position free of the receptacle to permit separation of the two members. Spring means is present and is normally biased in the closed position with the stud interconnected to a receptacle so as to eject the stud to the open position free of the receptacle when the stud is disconnected from the receptacle.

With the above objectives among others in mind, reference is made to the attached drawings.

DETAILED DESCRIPTION

Figure 5:
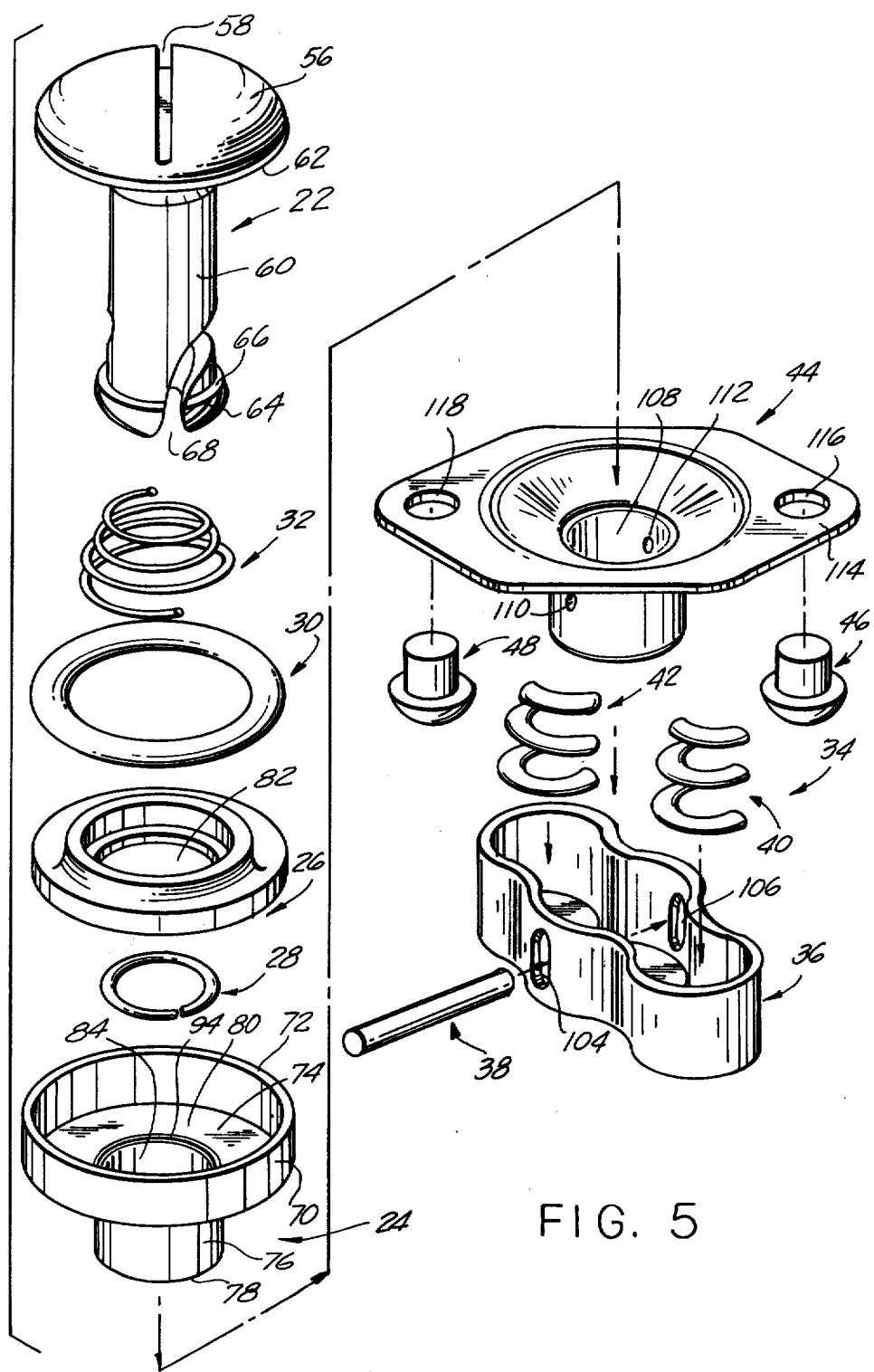
FIG. 5 is an exploded view of the stud assembly of the invention and a receptacle adapted to be coupled therewith.

Stud assembly 20 of the invention is shown in exploded form in FIG. 5. It includes a stud 22, a cup 24, a retainer 26, a retaining ring 28, and O-ring or gasket 30, and a helical spring 32.

Also shown in exploded form in FIG. 5 is a conventional type of receptacle 34 adapted to receive stud assembly 20 to form a fastener assembly of the type commonly known as a quarter turn fastener. The receptacle includes a housing 36, a cam follower or cross pin 38, a pair of tension springs 40 and 42, a mounting collar 44 and a pair of rivets 46 and 48 for mounting the receptacle 34 to a member to be fastened.

Figure 1:
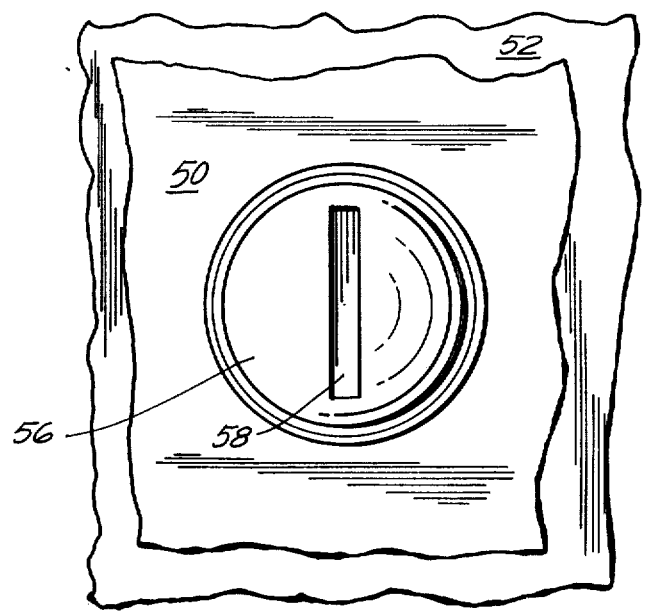
FIG. 1 is a top plan view of the stud assembly of the invention coupled to a receptacle and showing the assembly holding fragmentary portions of two members together.
Figure 2:
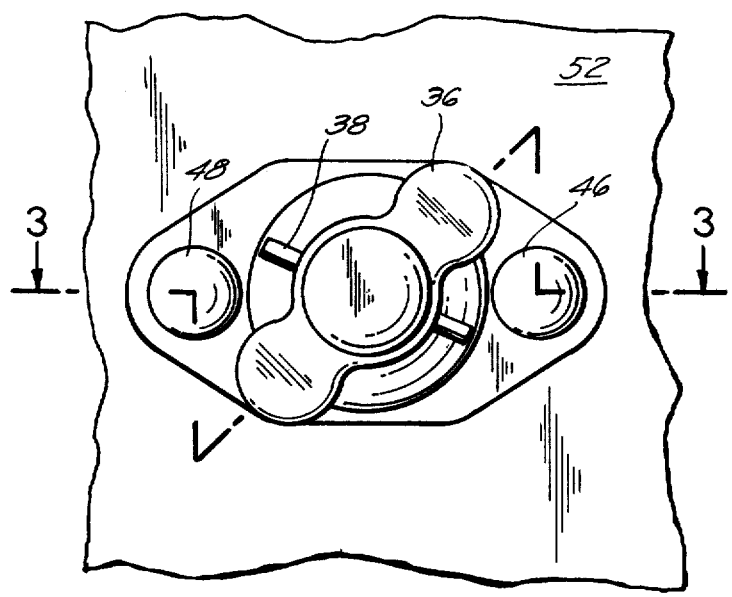
FIG. 2 is a bottom plan view thereof.
Figure 3:
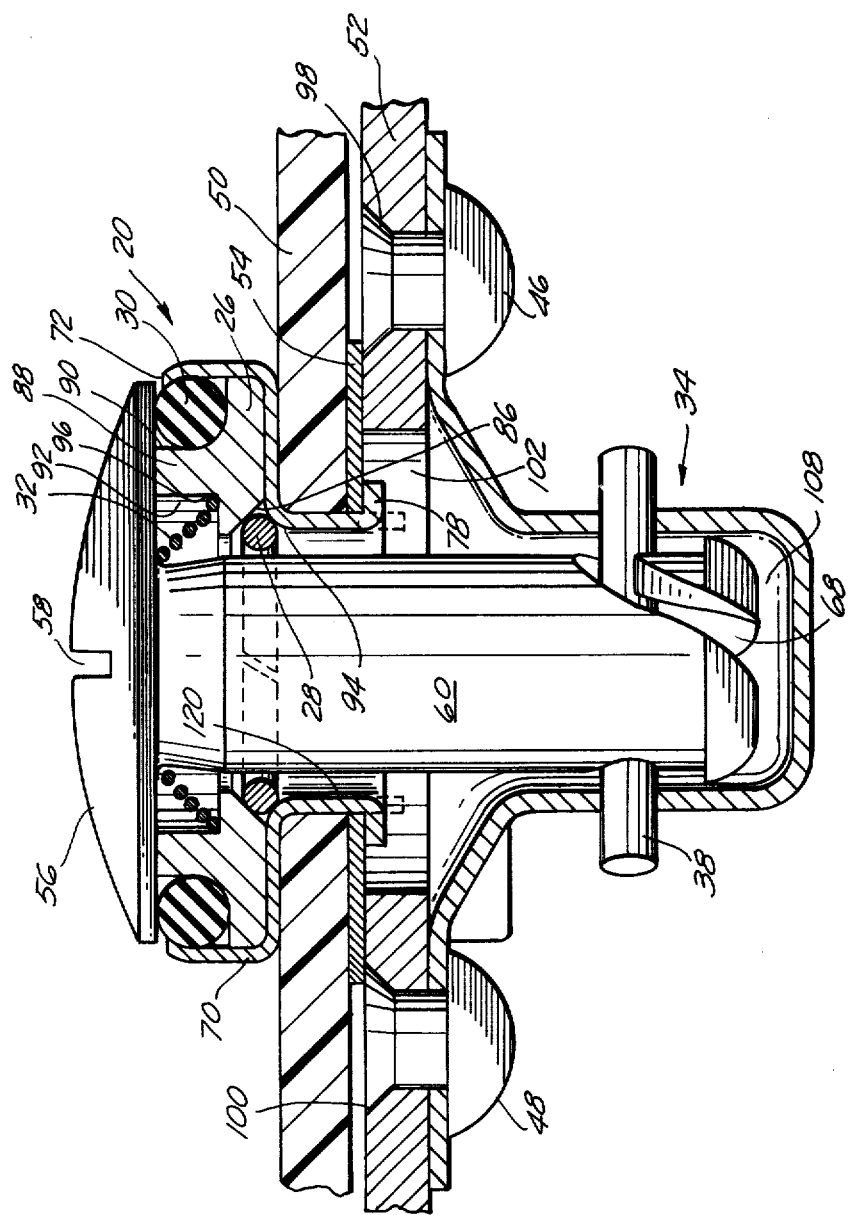
FIG. 3 is a sectional side elevation view thereof taken along the plane of line 3—3 of FIG. 2.

FIGS. 1-3 show stud assembly 20 and receptacle assembly 34 in fastened condition holding two panel members together. Stud assembly 20 is mounted to one panel member 50 and the receptacle assembly 34 is mounted to the second panel member 52. A washer 54 is shown captured therebetween.

Stud 22 includes an enlarged head 56 with a slot 58 therein for engagement by a tool to rotate the stud relative to fixed portions of the assembly to accomplish the fastening and unfastening procedures. Head 56 is enlarged with respect to a reduced diameter shank 60 so that the undersurface 62 of head 56 extends laterally from the outer diameter of shank 60. At the end of the shank 60 distal from head 56 is a lateral projection 64 which forms a shoulder 66 facing and opposed to laterally extending undersurface 62 of head 56. Means opposed to surfaces 62 and 64 extending outwardly from shank 62 form retention stops in a manner described in detail below.

Formed in the end of the shank 60 distal from the head end is a spiral cam slot 68 which terminates in a conventional locking detent and is positioned for interengagement with the cam follower 38 of receptacle 34.

Cup 24 has a through passageway from top to bottom and has a wider diameter cylindrically shaped upper portion 70 terminating with a slightly inwardly extending upper edge 72. The upper end portion 70 of cup 24 has an inwardly extending base wall 74 which communicates with the upper end of a reduced diameter lower tubular portion 76. The lower end 78 of lower portion 76 is free and is adapted to be interconnected with panel 50 for mounting of the stud assembly in a manner described in detail below. The chamber 80 formed in the upper end of cup 24 by the tubular inner wall of upper portion 70 and the lateral base wall 74 receives the remaining components of the stud assembly 20.

Retainer 26 has an outer diameter slightly smaller than the inner diameter of upper portion 70 so that it seats on lateral base wall 74 of the upper portion. In this position it has a central opening 82 in alignment with the opening 84 through lower portion 76 of the cup. The undersurface of retainer 26 substantially conforms to the surface of lateral bottom wall 74 of upper portion 70. The inner surface of retainer 26 adjacent opening 82 has a lower outwardly beveled part 86. The upper portion of retainer 26 has a central wall 88 separating an outer recess 90 and an inner recess 92. Gasket or O-ring 30 is mounted in recess 90 and helical spring 32 is mounted in recess 92. The retaining ring 28 seats against beveled surface 86 of retainer 26 and the arcuate upper rim 92 of lower portion 76 of the cup.

The inwardly extending upper edge 72 of the cup engages with the O-ring which in turn engages with the retainer 26 which in turn engages with the retainer ring 28 to hold all of these elements within cup 24.

Helical spring 32 has a narrow diameter upper end to engage with the inner edge of undersurface 62 of the head of the stud and has a wider diameter lower end to seat in the apex 96 of the rectangular shaped recess 92 of retainer 26. In this manner, helical spring 32 surrounding the shank 60 of stud 22 is captured between the undersurface 62 of the head of the stud and the surfaces of retainer 26 forming recess 92.

The upper edges of retainer 26 and O-ring 30 extend slightly above the upper rim 72 of the cup and form a flat receiving surface for the flat undersurface 62 of head 56 of the stud thus providing a relatively flush interengagement between the stud and cup in the closed condition.

Turning to use of the fastener formed by stud assembly 20 and receptacle 34, the two components for the fastener assembly are mounted in the following manner. The support structure or panel 52 is provided with appropriate mounting openings 98 and 100 adjacent to an opening 102. Tension spring 40 and 42 are positioned in the hollow interior of housing 36 and cam follower pin 38 is extended through opposing apertures 104 and 106 in the housing. The flanged collar 44 has a central well 108 for receiving the end of the stud and has opposing apertures 110 and 112 for alignment with apertures 104 and 106 so that the pin extends through the aligned apertures and couples the collar 44 with the housing 36. The undersurface of the flange portion 114 of collar 44 retains the tension springs 40 and 42 in biased condition within housing 36. Rivets 46 and 48 are then passed through openings 116 and 118 in the flange 114 of collar 44 and through openings 98 and 100 respectively in panel 52 and expanded in conventional fashion to mount the receptacle 34 in position on the panel with cup 108 in position in alignment with opening 102 in the panel for receipt of stud 22 therein.

Stud assembly 20 is assembled by putting helical spring 32 onto stud shank 60. "O" ring 30 is then assembled to retainer 26. Retainer with "O" ring attached is assembled to stud 60, retaining ring 28 is then positioned onto stud 60. This complete assembly is then inserted into upper portion of cup 24. The upper edge 72 of cup 24 is then crimped to retain all components. In assembly the retaining ring 28 will seat in the beveled surface 86 of retainer 26.

Full extension of the stud 22 therein will bring undersurface 62 of the head of the stud into engagement with the upper exposed surfaces of retainer 26 and O-ring 30 thus forming a sealing interengagement therebetween. In fact, an effective water seal is produced. This action also compresses helical spring 32 into a predetermined biased condition. Release of pressure on stud 22 will permit biased spring 32 to force the stud upward and outward from cup 24. The stud will be restricted from full ejection by engagement between the shoulder 66 on extension 64 of the free end of the stud and retainer ring 28. Thus, all of the elements of stud assembly 20 are maintained in coupled relationship with the stud permitting limited reciprocal movement controlled by the engagement between surface 66 and retaining ring 28 in one direction and the undersurface 62 of the head of the stud and the upper surface of retainer 26 and O-ring 30 in the other direction.

Cup 24 is mounted on panel 50 by extending narrow diameter lower portion 78 into an opening 120 in the panel and flanging over bottom end 78 into a lateral flange in position to capture the undersurface of the panel 50 between flange 78 and the undersurface of inwardly extending base wall 74 of upper portion 70 of the cup. Thus, an effective single hole mounting is provided for the stud assembly. It is common to form panel 50 of plastic and therefore, to avoid any possibility of damage of the plastic during the flanging over of end portion 78 to provide tight mounting of the cup on panel 50, a washer 54 of hard material is positioned between the panel and the flange. Naturally, the washer 54 can be dispensed within if careful mounting procedures are utilized. However, for time saving purposes, the washer 54 provides an easy means of avoiding any potential damage to panel 50 as the cup 24 is mounted in position and thereafter in use.

With cup 24 mounted in this manner in panel 50, stud shank 60 extends through opening 120 in the panel. The opening 120 is in alignment with opening 102 in panel 52 so that the stud shank extends through the aligned openings into engagement with the cam follower pin 38. Full depression of stud 22 and quarter turn rotation thereof will move cam follower 38 along cam slot 68 biasing tension spring 40 and 42 and bringing panels 50 and 52 into tight lock interengagement. This condition is depicted in FIGS. 1-3 of the drawings.

Figure 4:
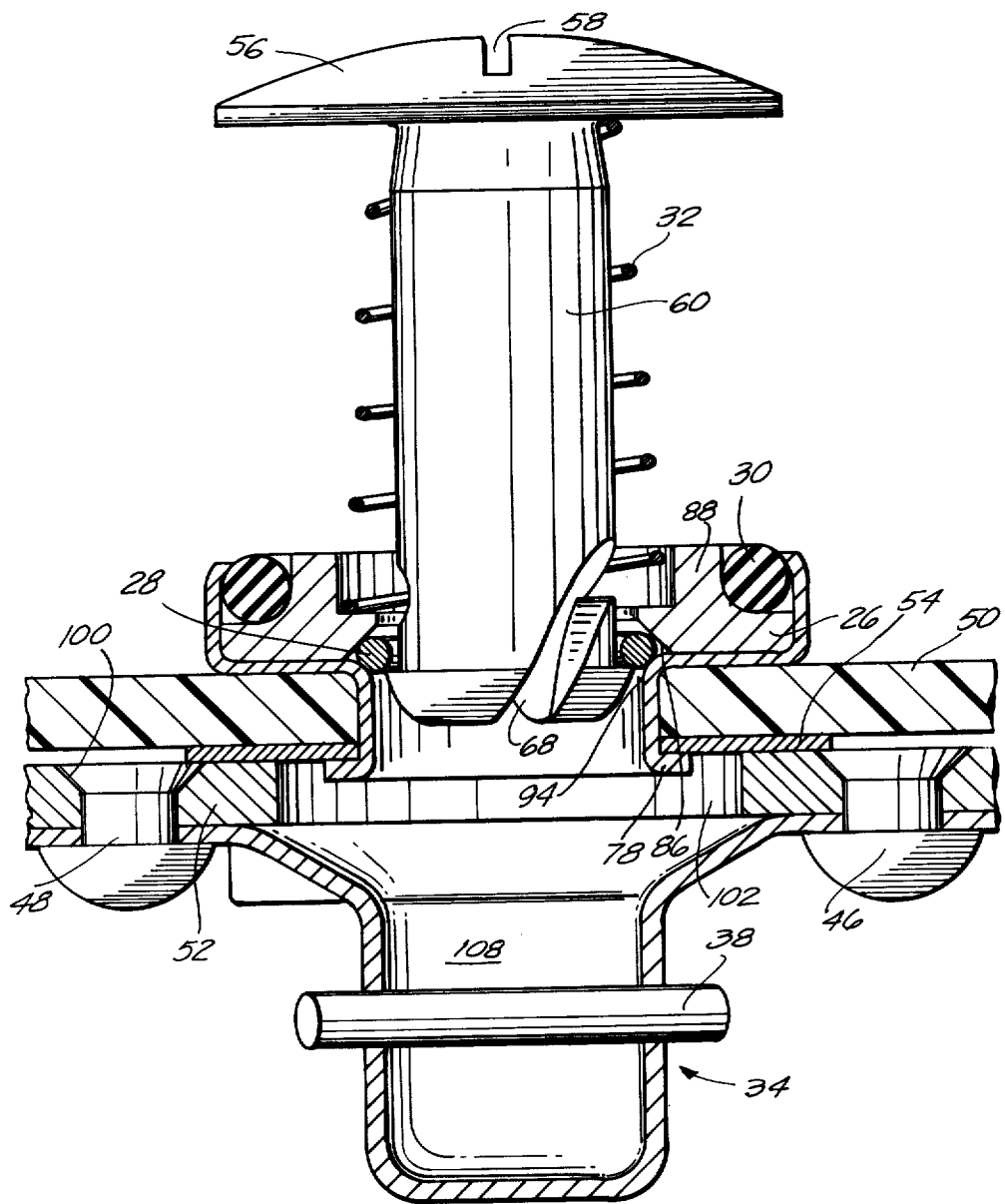
FIG. 4 is a sectional side elevation view thereof along the same plane as FIG. 3 but with the fastener in the open fully ejected position freeing the fragmentary portion of the two members.

For quick disassembly, a tool is positioned in slot 58 and stud 22 is rotated in the opposite direction approximately one quarter turn at which time cam follower pin 38 will be fully released from slot 68 whereupon compressed helical spring 32 will fully eject stud shank 60 from receptacle 34 and panel 52. The ejection movement continues until surface 66 engages with retainer ring 28. In this position, as shown in FIG. 4, since the remaining bottom end portion of the stud is of less thickness than panel 50 or the lower portion of cup 24, the stud will be fully ejected from panel 52 and panels 50 and 52 can be displaced from one another without interference. The stud is retained with cup 24 so that reassembly of the panels and fastening thereof can be accomplished quickly and efficiently in the same manner. In short, panels 50 and 52 can be brought into engagement, stud 22 forced through the aligned openings, biasing spring 32, until the cam slot 68 is again in communication with pin 38 whereupon rotation of the stud will once again couple the stud assembly and receptacle and fasten the two panels together.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A full ejection stud assembly adapted to be coupled to one member and removably interconnected with a receptacle coupled to a second member to form a fastener assembly for holding the two members together, the stud assembly comprising:
    a stud having an enlarged head and a reduced diameter shank extending from one side of the head and having means thereon for interconnecting with a receptacle;
    a cup having a through passageway for slidable extension of the shank therethrough;
    the cup having mounting means thereon for mounting the cup on the one member in position with respect to an opening in the one member so that the shank of the stud can pass reciprocally therethrough;
    retention means on the cup and stud to limit the reciprocal movement of the stud shank through the passageway of the cup and the opening in the one member between a closed position for interconnecting with a receptacle to hold the two members together and an open position free of the receptacle to permit separation of the two members; and
    spring means normally biased in the closed position with the stud interconnected to a receptacle so as to eject the stud to the open position free of the receptacle and the second member when the stud is disconnected from the receptacle permitting the two members to be displaced from one another without interference from the stud.

2. The invention in accordance with claim 1 wherein the means on the stud shank for interconnection with a receptacle includes a slot in the end thereof distal from the head, the slot adapted to receive a cam follower in the receptacle whereupon rotation of the stud relative to the receptacle will cause the cam follower to travel along the cam slot into a locking detent at the end thereof completing the interconnection between the stud and the receptacle, and relative rotation in the opposite direction will cause the cam follower to exit from the cam slot freeing the stud from the receptacle, the amount of rotation between the open and closed position being approximately one quarter turn of the stud relative to the receptacle.

3. The invention in accordance with claim 1 wherein the cup is formed with a hollow enlarged tubular upper portion extending into a narrower diameter hollow tubular lower portion which terminates in an outwardly extending lateral flange, the flange engaging with the undersurface of the one member capturing the one member between the flange and the undersurface of the enlarged upper portion of the cup thereby mounting the cup on the one member.

4. The invention in accordance with claim 3 wherein a washer is positioned between the two members being fastened for engagement by the flange of the cup to facilitate rigid interconnection between the cup and the one member.

5. The invention in accordance with claim 4 wherein at least the one member is of plastic material.

6. The invention in accordance with claim 1 wherein the receptacle is riveted to the underside of the second member and has a receiving housing in alignment with an opening through the second member and a cam follower in the housing, the stud shank being extandible through the passageway in the cup, the opening in the one member and the opening in the second member into the housing of the receptacle and having a cam slow in its leading end for interengagement with the cam follower in the housing to be rotatable with respect thereto between an open and a closed position.

7. A full ejection stud assembly adapted to be coupled to one member and removably interconnected with a receptacle coupled to a second member to form a fastener assembly for holding the two members together, the stud assembly comprising;
- a stud having an enlarged head and a reduced diameter shank extending from one side of the head and having means thereon for interconnecting with a receptacle;
- a cup having a through passageway for slidable extension of the shank therethrough;
- the cup having mounting means thereon for mounting the cup on the one member in position with respect to an opening in the one member so that the shank of the stud can pass reciprocally therethrough;
- retention means on the cup and stud to limit the reciprocal movement of the stud shank through the passageway of the cup and the opening in the one member between a closed position for interconnecting with a receptacle to hold the two members together and an open position free of the receptacle to permit separation of the two members;
- spring means normally biased in the closed position with the stud interconnected to a receptacle so as to eject the stud to the open position free of the receptacle when the stud is disconnected from the receptacle;
- the retension means including a substantially disc shaped retainer housed in the cup between the undersurface of the head of the stud and an opposing surface in the cup;
- the retainer having a central aperture therethrough and the surface surrounding the central aperture having a beveled portion;
- a retaining ring in the cup and held in position between the beveled surface of the retainer and an adjacent opposing surface of the cup;
- a lateral extension on the end of the shank of the stud distal from the head end; and
- the stud being restricted from full displacement from the cup in one direction by engagement between the lateral extension on the end of the shank and the retaining ring and in the other direction by engagement between the undersurface of the head and the upper surface of the retainer.

8. The invention in accordance with claim 7 wherein the spring is a helical spring captured between the undersurface of the head of the stud and surfaces forming a recess in the retainer adjacent to the undersurface of the head of the stud and the adjacent shank portion of the stud, the helical spring being positioned circumferentially about the shank of the stud.

9. The invention in accordance with claim 7 wherein a peripheral seal is formed between the outer peripheral edge of the head of the stud and the adjacent circumferential peripheral end portion of the cup.

10. The invention in accordance with claim 9 wherein the seal is formed by an O-ring mounted in a peripheral depression in the retainer so that the head of the stud in the closed position is positioned substantially flush with the upper surface of the cup.

* * * * *